United States Patent [19]

Nishitani

[11] Patent Number: 4,835,611

[45] Date of Patent: May 30, 1989

[54] TIMING SIGNAL GENERATOR FOR A VIDEO SIGNAL PROCESSOR

[75] Inventor: Takao Nishitani, Tokyo, Japan

[73] Assignee: NEC Corporation, Tokyo, Japan

[21] Appl. No.: 138,129

[22] Filed: Dec. 28, 1987

[30] Foreign Application Priority Data

Dec. 27, 1986 [JP] Japan ............................ 61-312724

[51] Int. Cl.$^4$ ............................................ H04N 5/14

[52] U.S. Cl. ........................................ 358/160; 382/33

[58] Field of Search ................ 358/160, 10, 139, 107, 358/108, 125, 126; 364/516, 517; 382/33, 16, 34

[56] References Cited

U.S. PATENT DOCUMENTS

| | | | |
|---|---|---|---|
| 4,488,180 | 12/1984 | Rabinowitz | 358/22 |
| 4,559,553 | 12/1985 | van Chang | 358/10 |
| 4,570,181 | 2/1986 | Yamamura | 358/160 |

FOREIGN PATENT DOCUMENTS

| | | | |
|---|---|---|---|
| 0169709 | 1/1986 | European Pat. Off. . | |
| 0193854 | 11/1982 | Japan | 382/16 |
| 0146365 | 8/1984 | Japan | 382/33 |

*Primary Examiner*—James J. Groody

*Assistant Examiner*—David E. Harvey

*Attorney, Agent, or Firm*—Sughrue, Mion, Zinn, Macpeak & Seas

[57] ABSTRACT

A timing signl generator for use in a multi-processor real-time digital video processing system. Each processor in the multiprocessing system is responsible for processing a selected portion of the video picture frame, as designated by the timing signal generator in each processor. The timing signals include a write signal instructing the receipt of the input picture block, an execution signal instructing the processing of the picture block, and an output command signal instructing the read out of the processed picture block. The timing signal generator is composed of row and column memory circuits which are respectively addressed by row and column address counters. The counters are caused to advance in response to indications that preselected coordinates in the picture frame have been reached. As inputs, the timing signal generator receives the pixel clock as well as horizontal and vertical sync signals, the former and latter of which are counted to keep track of the current coordinates. Outputs from the row and column memories are decoded to form the write, execute and output command signals.

9 Claims, 3 Drawing Sheets

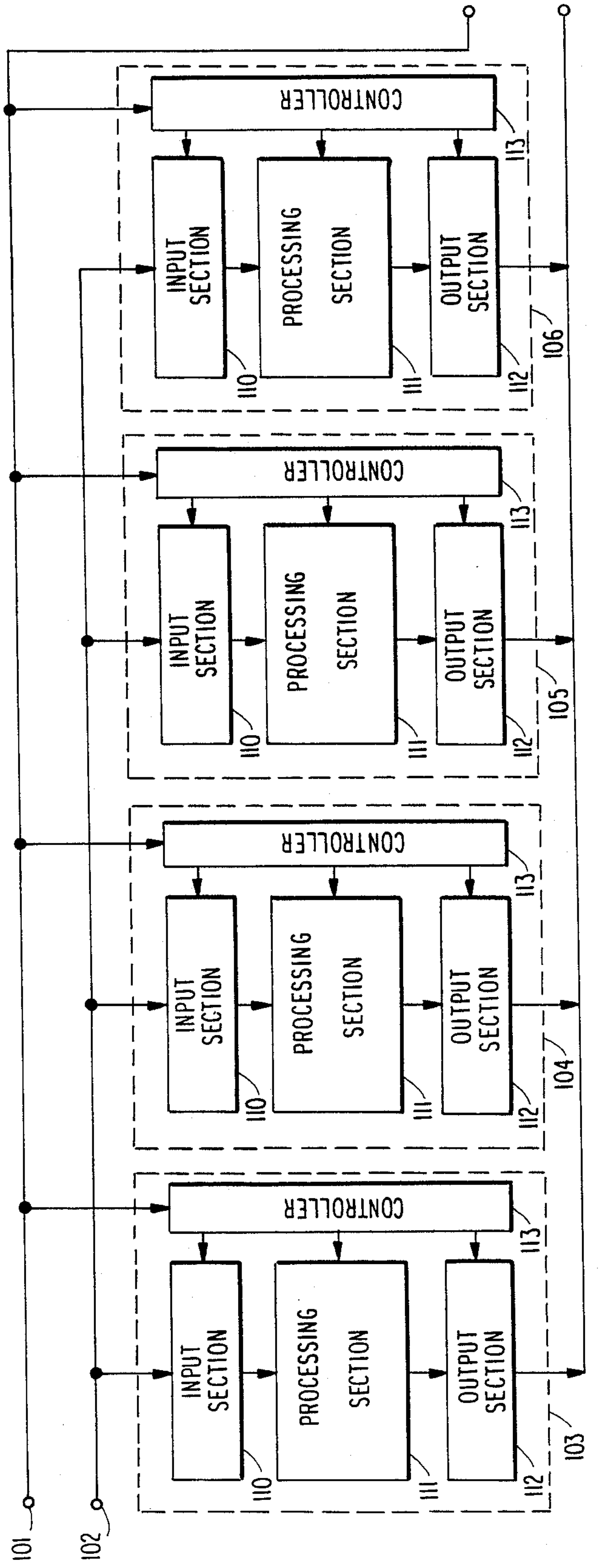
FIG. 1
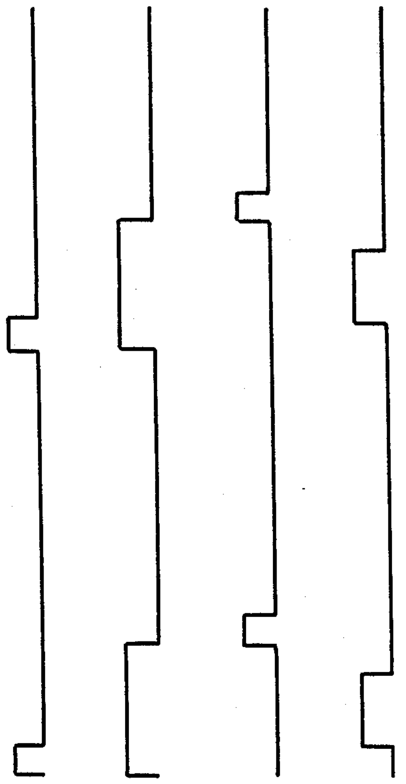
FIG. 2A SYNC SIGNAL
FIG. 2B WRITE SIGNAL
FIG. 2C EXECUTION SIGNAL
FIG. 2D OUTPUT COMMAND SIGNAL FIG. 4
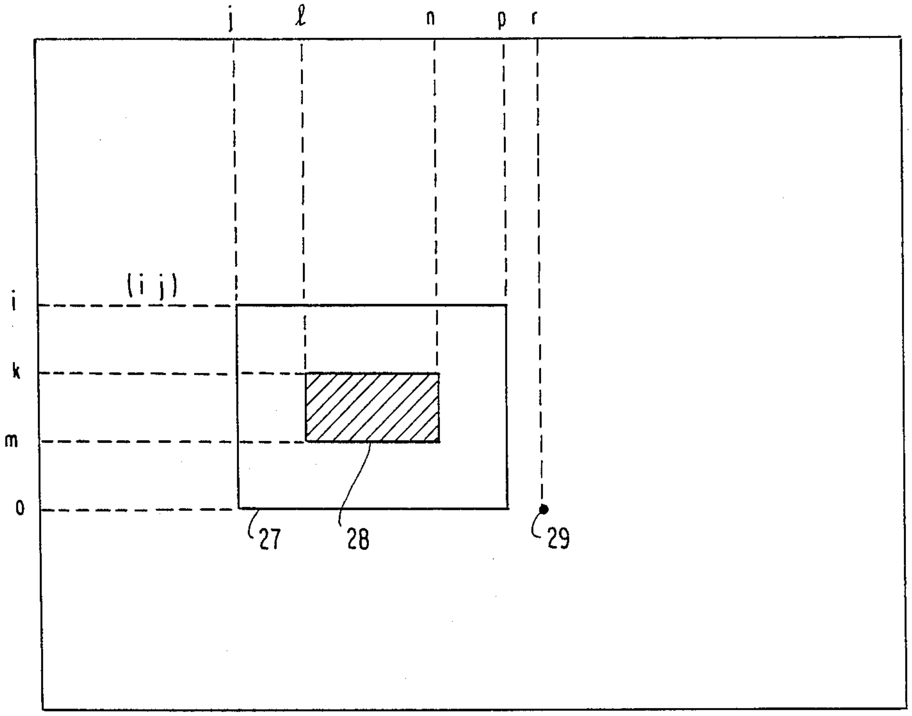
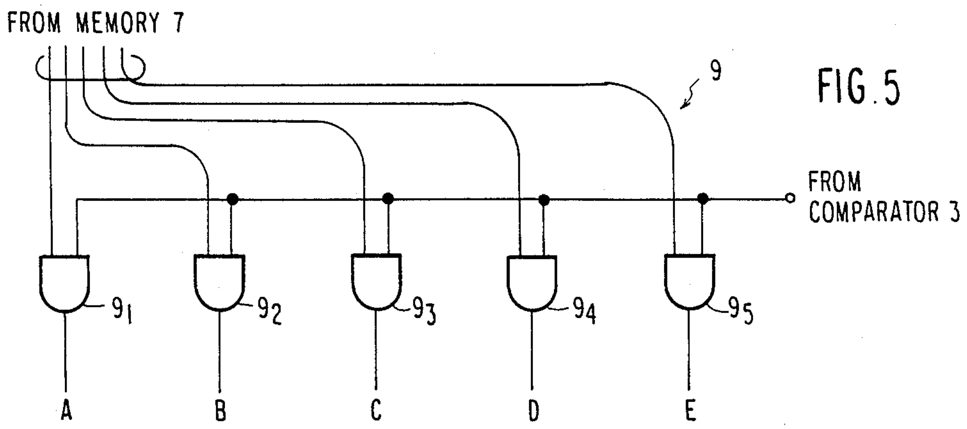
FIG. 5
FIG. 6
| CODE | | | | | LEGEND |
|---|---|---|---|---|---|
| A | B | C | D | E | |
| 1 | 0 | 0 | 0 | 0 | START OF INPUT PICTURE BLOCK |
| 0 | 1 | 0 | 0 | 0 | END OF INPUT PICTURE BLOCK |
| 0 | 0 | 1 | 0 | 0 | START OF OUTPUT PICTURE BLOCK |
| 0 | 0 | 0 | 1 | 0 | END OF OUTPUT PICTURE BLOCK |
| 0 | 0 | 0 | 0 | 1 | START OF EXECUTION |

TIMING SIGNAL GENERATOR FOR A VIDEO SIGNAL PROCESSOR

BACKGROUND OF THE INVENTION

The present invention relates to a timing signal generator for use in a digital video signal processor.

Large scale integrated circuit (LSI) technology has so significantly developed that a signal processor capable of processing digital signals in the audio band on a real time basis is already available in a single-chip LSI. A problem, however, in implementing a processor for real time processing of video signals, having a band some 1,000 times as wide as audio signals, lies the fact in that the processing speed of the device cannot readily be increased 1,000 times. A conceivable solution is to achieve such 1,000 times faster processing would be to use a plurality of processors, each having a speed comparable to the processor for audio band signals and having them operate in parallel. An example of such a processor is described in European Patent Application No. A2 0169709 (corresponding to U.S. patent application Ser. No. 756,027 filed on July 17, 1985) published on Jan. 29, 1986. This processor, comprising a plurality of unit processors, divides a frame of video signals into a plurality of picture blocks, and each unit processor processes the picture block assigned to it. The picture blocks to be processed and outputted by the unit processors are so allocated that the output picture block of each unit processor neither overlaps with nor has a gap between itself and the output picture block of any other unit processor. Accordingly, the final processed frame is obtained by synthesizing the output picture blocks from the plurality of unit processors. Meanwhile, since the input block in each unit processor is set greater than the area of the picture block assigned to it, communication between the individual unit processors can be virtually nil. Thus, the picture block to be inputted is greater than that of the output picture block.

In such a multi-processor arrangement, each unit processor requires a timing signal generator or the like for generating signals indicating the areas of input picture blocks, the areas of output picture blocks and the start of processing by each unit processor.

As mentioned above since the input and output areas assigned to a unit processor the next are different with each unit processor, the timing signal is also different in each processor. Thus although all unit processors share a common overall structure, LSI implementation of the unit processors difficult is because the timing signal generator of each unit processor is different.

Moreover, it may also become necessary, depending on the digital signal processing method that is applied, to vary the sizes of the input and output picture blocks, or to alter the positions of the input and output picture blocks according to the result of digital signal processing. These needs can be met by storing in a random access memory (RAM) addresses of the input and output picture blocks that have to be changed. However, since the use of a RAM entails too long a time in transferring the pertinent data the use of such a RAM is not preferable in a processor which has to process digital signals at high speed.

SUMMARY OF THE INVENTION

An object of the present invention, therefore, is to obviate the foregoing disadvantages and provide a timing signal generator of simple hardware and yet capable of altering the areas of input and output picture blocks.

According to the present invention, a timing signal generator for use in a processor for digital processing of a picture block constituting a part of a picture frame, comprises a column counter reset in synchronization with a horizontal sync signal and advanced in synchronization with a sampling signal in the horizontal direction. A column comparator compares a transition point column number indicating the transition point in the column direction and the count of the column counter and outputs a column identity signal if the two values are found to be identical. A column address counter is advanced by the column identity signal and reset by the horizontal sync signal. A column memory receives the count of the column address counter as an address and outputs the transition point column number in response to this address. A row counter is reset in synchronization with a vertical sync signal and advanced in synchronization with the horizontal sync signal. A row comparator compares a transition point row number indicating the transition point in the row direction and the count of the row counter and outputs a row identity signal if the two values are found identical. A row address counter is advanced by the row identity signal and reset by the vertical sync signal. A row memory receives the count of the row address counter as an address and outputs the transition point row number of this address. A signal generator is responsive to the column identity signal and row identity signal to generate signals for instructing the inputting, outputting and processing of the picture block to, from or by the processor.

Using this structure, the present invention makes it possible to vary the areas of input and output picture blocks at high speed and yet with no difficulty.

The above and other objects, features and advantages of the present invention will become apparent from the following detailed description when taken with the accompanying drawings in which:

FIG. 1 is a block diagram illustrating a video signal processor to which the invention is applicable;

FIGS. 2A to 2D are waveform diagrams of timing signals used in the signal processor;

FIG. 4 is a diagram illustrating the relationship between a picture block and a frame;

FIG. 5 is a circuit diagram illustrating the details of a gate circuit; and

FIG. 6 is a table showing a typical set of identification codes.

Figure 3:
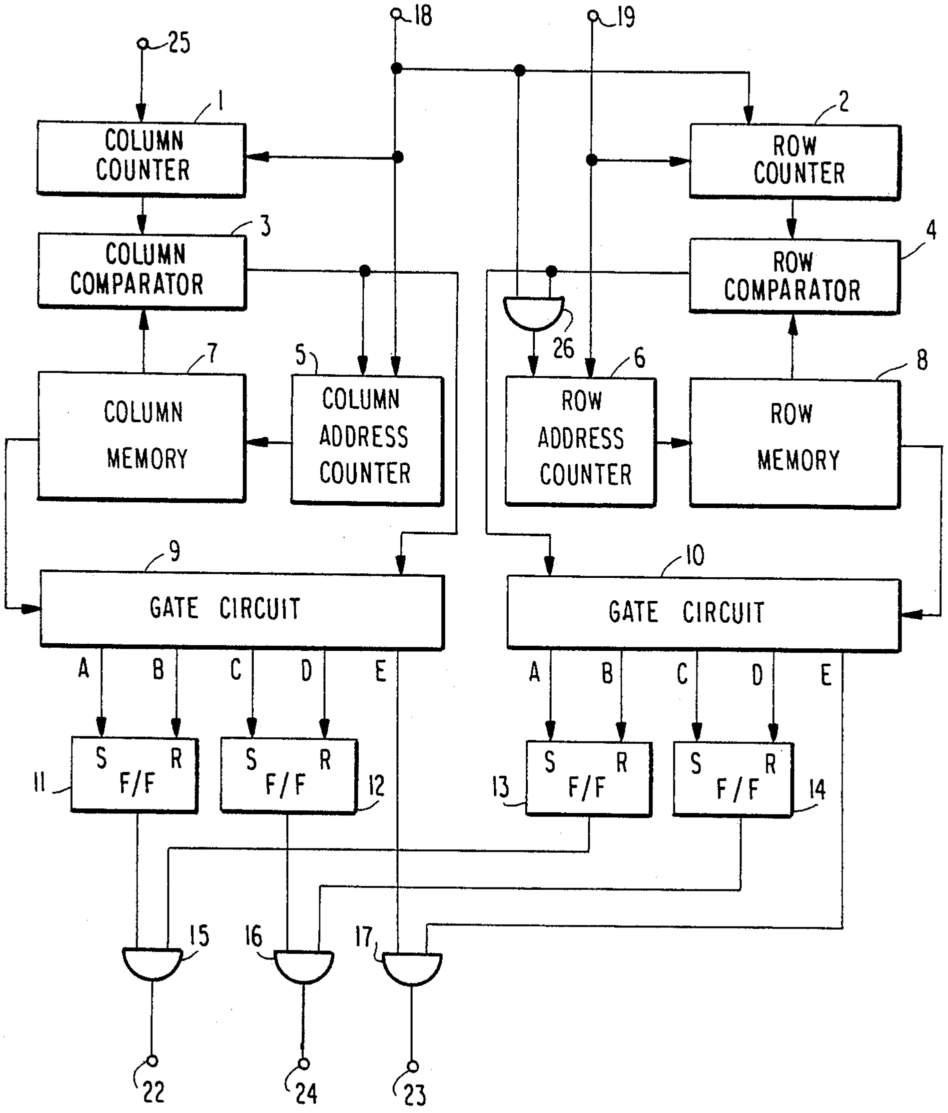
FIG. 3 is a block diagram illustrating a preferred embodiment of the invention.

First to facilitate understanding of the present invention, the video signal processor to which the invention is applicable will be described with reference to FIGS. 1 and 2.

The video signal processor has a plurality of unit processors 103 to 106 for processing a plurality of picture blocks into which a frame entered from a terminal 102 is divided. Each processor is composed of an input section 110 for taking in a prescribed picture block, a processing section 111 for processing the input picture block, an output section 112 for outputting the processed picture block, and a controller 113 responsive to a sync signal (FIG. 2A) from a terminal 101 for generating timing signals to control the input, processing and output sections. The timing signals include, for instance, a write signal (FIG. 2B) instructing the receipt of the input picture block into the input section 110, an execution signal (FIG. 2C) instructing to processing of the picture block, and an output command signal (FIG. 2D) instructing the outputting of the processed picture block. For details of the processor, reference may be made to the Ser. No. 756,027 mentioned above.

FIG. 3 is a block diagram illustrating a preferred embodiment of the present invention. Referring to the figure, a column counter 1 counts pixel clocks from a terminal 25, and is reset by a horizontal sync (H sync) signal from a terminal 18. A row counter 2 counts H sync signals, and is reset by a vertical sync (V sync) signal from a terminal 19. A column address counter 5 generates a column address for a column memory 7 in response to a column identity signal from a column comparator 3 to be described below, and a row address counter 6 generates a row address for a row memory 8 in response to a row identity signal from a row comparator 4. The address counters 5 and 6 are reset by an H sync signal and V sync signal, respectively. The column and row memories 7 and 8, to be specific, are loaded in advance with the column and row numbers of the coordinates of an input picture block, output picture block and processing start point. The input and output picture blocks are typically illustrated in FIG. 4. The memories 7 and 8 also store identification codes (FIG. 6) to indicate what coordinate column and row numbers of the input picture block, output picture block and processing start point are represented by a given column number and row number. Therefore, the memories 7 and 8, upon receiving address signals, supply a column number and row number to the column and row comparators 3 and 4, respectively, and at the same time supply an identification code to gate circuits 9 and 10. The column comparator 3, when it finds the column number from the column counter 1 and that from the column memory 7 to be identical, supplies the column identity signal to the column address counter 5. Meanwhile, the row comparator 4, when it finds the row number from the row counter 2 and that from the row memory 8 to be identical, supplies the row identity signal to the row address counter 6 by way of a gate 26. Since the column and row address counters 5 and 6 are advanced by the column and row identity signals, the counters 5 and 6 renew the address every time the comparators 3 and 4 detect the identity of column numbers, for example, j to r of FIG. 4 and row numbers i to o. Thus the column address counter 5 generates addresses 0 to 4 in response to column numbers j to r, respectively, and the row address counter 6 generators addresses 0 to 3 in response to row numbers i to o, respectively. The column and row identity signals from the comparators 3 and 4 are also supplied to the gate circuits 9 and 10, which are responsive to the identity signals for outputting the identification codes from the memories 7 and 8 to terminals A to E. Gates 15 to 17 and set/reset type flip-flops (F/F's) 11 to 14 output a write signal (FIG. 2B), output command signal (FIG. 2D) and execution signal (FIG. 2C) to terminals 22, 24 and 23, respectively, in response to the identification codes from the gates circuits 9 and 10.

FIG. 5 is a circuit diagram illustrating an example of the gate circuit. 9. The gate circuit 9 consists of five AND gates 91 to 95 responsive to the identification codes from the memory 7 and the column identity signal from the comparator 3. The identification codes are typically shown in the table of FIG. 6. Since the gate circuit 10 has the same structure and similar operation, further description is omitted.

Next will be described the operation of the timing signal generator circuit of FIG. 3 with reference to the picture block shown in FIG. 4 by way of example. In FIG. 4, reference numerals 27 to 29 respectively represent input and output picture blocks and the processing start point assigned to a unit processor, and the series of letters j to r and i to o respectively represent column numbers and row numbers. The start of the write signal, shown in FIG. 2B, will be described below with reference to FIGS. 3 and 4.

At the start of the video signals for one frame, the H and V sync signals from the terminals 18 and 19 reset the column and row counters 1 and 2, respectively. The H and V sync signals also reset the column and row address counters 5 and 6, respectively. As a result, the address counters 5 and 6, supply No. 0 to the column and row memories 7 and 8 as an address signal. Responding to column address No. 0, the column memory 7 supplies the column number j of the start point of the input picture block and an input identification code indicating the input picture block to the column comparator 3 and the gate circuit 9. Similarly, responding to the row address No. 0, the row memory 8 supplies the row number i of the start point of the input picture block and an input identification code to the row comparator 4 and the gate circuit 10. The column comparator 3, when it finds the column number j from the column memory 7 and the count of the column counter 1 to be identical, supplies the j-column identity signal to the gate circuit 9. The gate 9, responding to the j-column identity signal and the identification code, outputs a set signal to the F/F 11 via the terminal A. Before the i-th row, the row comparator 4 outputs no identity signal because the count of the row counter 2 is below i. Next, as the row counter counts H sync signals and the count reaches i, the gate circuit 10 outputs a set signal to the F/F 13 in response to the i-row identity signal. The F/F's 11 and 13 are set in response to the set signals and cause the write signal (FIG. 2B) to rise.

Similarly, the output command signal (FIG. 2D) is started by the supply of the l-column and k-row identity signals from the column and row comparators 3 and 4, respectively, to the gate 16. In further detail, the column and row address counters 5 and 6 are advanced by +1 by the j-column and i-row identity signals, and supply an address No. 1 to the column and row memories 7 and 8, respectively. In response to the address No. 1, the column memory 7 outputs the column number 1 and an output identification code to the comparator 3 and the gate circuit 9. The gate circuit 9, responding to the l-column identity signal from the column comparator 3, provides a set signal to the F/F 12 via the terminal C. As in the case of the write signal, however, the row comparator 4 outputs no k-row identity signal before the k-th row, so that the gate circuit 10 supplies no set signal to the F/F 14. Next, when the row counter 2 counts H sync signals and its count reaches k, the comparator 4 outputs the k-row identity signal, so that the gate circuit 10 outputs a set signal to the F/F 14. As a result, the gate 16 causes the output command signal (FIG. 2D) to start.

The fall of the output command signal takes place as described below. In response to an l-column identity signal, the column address counter 5 further counts up by +1, and outputs address No. 2 to the memory 7, which, responding to address No. 2, outputs a column number n, indicating the ending point of an output picture block, and an output identification code to the column comparator 3 and gate circuit 9. The column comparator 3, when the count of the column counter reaches n, supplies an n column identity signal to the F/F 12 via the gate circuit 9. The F/F 12 is reset in response to an n-column identity signal, and causes the output command signal (FIG. 2D) to fall. In this way, the output command signal starts at the column l and the row k, and ends at the column n and the row k. This output command signal is outputted on each of the rows k to m on which the F/F 14 is reset to indicate the end of the output picture block 28.

The fall of the write signal takes place in a similar way to that of the output command signal. In response to an n-column identity signal, the address counter 5 counts up by +1, and outputs an address No. 3 to the memory 7, which, responding to the address No. 3, supplies the column number p of the ending point of the input picture block to the column comparator 3. The column comparator 3, when the count of the column counter 1 reaches p, supplies a p-column identity signal to the F/F 11. The F/F 11 is reset in response to the p-column identity signal, and causes the write signal to fall. In this way, the write signal, starting at the row i and the column j and ending at the row i and the column p, is output on each of the rows i to o on which the F/F 14 is reset.

Next will be explained the execution signal. As the column address counter 5 counts up by +1 in response to the p-column identity signal and supplies address No. 4 to the memory 7, the memory 7 provides a column number 4 to the column comparator 3, which, when the count of the column counter 1 reaches r, supplies an r-column identity signal to one of the input terminals of the gate 17. The gate 17, responding to an o-row identity signal from the row comparator 4 and the r-column identity signal, outputs the execution signal to the terminal 23.

What is claimed is:

1. A timing signal generator for use in a processor for digitally processing a picture block constituting a part of a picture frame, comprising:
column counter means reset in synchronization with a horizontal sync signal and advanced to produce a column count in synchronization with a sampling signal;
column comparator means for comparing a transition point column number, indicating a transition point in the column direction, and the column count, and outputting a column identity signal if said transition point column number and said column count are found identical;
column address counter means advanced by said column identity signal to produce a column address and reset by said horizontal sync signal;
column memory means responsive to said column address for outputting said transition point column number;
row counter means reset in synchronization with a vertical sync signal and advanced to produce a row count in synchronization with said horizontal sync signal;
row comparator means for comparing a transition point row number, indicating a transition point in the row direction, and the row count, and outputting a row identity signal if said transition point row number and said row count are found identical;
row address counter means advanced to produce a row address by said row identity signal and reset by said vertical sync signal;
row memory means responsive to the row address for outputting said transition point row number; and
signal generator means responsive to said column identity signal and row identity signal for generating signals to instruct the inputting, outputting and processing of said picture block to, from and by said processor respectively.

2. A timing signal generator as claimed in claim 1, wherein said column memory means, in response to said column addresses, further outputs first identification codes corresponding to said column addresses, and wherein said signal generator means includes first gate means receiving said first identification codes and said column identity signal, and set/reset circuit means coupled to ones of the outputs of said first gate means, said first gate means gating said first identification codes to said set/reset circuit means in response to said column identity signal.

3. A timing signal generator as claimed in claim 2, wherein said row memory means, in response to said row addresses, further outputs second identification codes corresponding to said row addresses, and wherein said signal generator means includes second gates means receiving said second identification codes and said row identity signal, said set/reset circuit means being coupled to ones of the outputs of said second gate means, said second gate means gating said second identification codes to said set/reset circuit means in response to said row identity signal.

4. A timing signal generator as claimed in claim 3, wherein said set/reset circuit means comprises a plurality of flip-flop circuits, each of which is set by one bit of one of said first and second identification codes, and reset by another bit of said one of said first and second identification code.

5. A timing signal generator as claimed in claim 4, wherein a first group of said flip-flop circuits are coupled to ones of the outputs of said first gate means, and a second group of said flip-flop circuits are coupled to ones of the outputs of said second gate means.

6. A timing signal generator as claimed in claim 5, further comprising a first gate coupled to a first flip-flop of said first group and a first flip-flop of said second group, for generating a write signal when both of said first flip-flops are set.

7. A timing signal generator as claimed in claim 6, further comprising a second gate coupled to a second flip-flop of said first group and a second flip-flop of said second group, for generating an output command signal when both of said second flip-flops are set.

8. A timing signal generator as claimed in claim 7, further comprising a third gate coupled to an output of said first gate means and to an output of said second gate means, for generating an execute signal when said outputs are both of high level.

9. A timing generator for use in a processor for digitally processing a picture block constituting a part of a picture frame, comprising:
column counter means advanced by a sampling signal and reset by a horizontal sync signal;
row counter means advanced by said horizontal sync signal and reset by a vertical sync signal;

column comparator means for comparing a transition point column number and the output of said column counter means, and outputting a column identity signal if said transition point column number and said column counter means output are found identical;

row comparator means for comparing a transition point row number with the output of said row counter means, and outputting a row identity signal if said transition point row number and the output of said row counter means are found identical;

column address counter means advanced by said column identity signal and reset by said horizontal sync signal, for generating a column address;

row address counter means advanced by said row identity signal and reset by said vertical sync signal, for producing a row address;

column memory means responsive to each column address for outputting a corresponding first identification code;

row memory means responsive to each row address for outputting a second identification code; and decoder means for decoding said first and second identification codes in response to said column identity signal and said row identity signal, respectively, to generate at least a write, an output command and an execute signal for use by said processor.

* * * * *

UNITED STATES PATENT AND TRADEMARK OFFICE

CERTIFICATE OF CORRECTION

PATENT NO. : 4,835,611

DATED : MAY 30, 1989

INVENTOR(S) : NISHITANI

It is certified that error appears in the above-identified patent and that said Letters Patent is hereby corrected as shown below:

n the title page, in the ABSTRACT,
line 1, before "A timing" insert --The invention rovides--; change "A" to --a--; delete "signl" and insert -signal--.

olumn 1, line 14, delete "lies the fact in" and insert -lies in the fact--;
line 17, after "such" delete "1000 times";
line 47, after "processor" delete "the next".

Signed and Sealed this

Twentieth Day of March, 1990

Attest:

JEFFREY M. SAMUELS

Attesting Officer

*Acting Commissioner of Patents and Trademarks*